(12) United States Patent
Reist

(10) Patent No.: US 7,785,011 B2
(45) Date of Patent: Aug. 31, 2010

(54) ROLLER ELEMENT

(75) Inventor: Walter Reist, Hinwil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 936 days.

(21) Appl. No.: 11/569,214

(22) PCT Filed: May 20, 2005

(86) PCT No.: PCT/CH2005/000288

§ 371 (c)(1),
(2), (4) Date: Dec. 7, 2006

(87) PCT Pub. No.: WO2005/113391

PCT Pub. Date: Dec. 1, 2005

(65) Prior Publication Data

US 2008/0078158 A1  Apr. 3, 2008

(30) Foreign Application Priority Data

May 21, 2004  (CH) .................................. 884/04

(51) Int. Cl.
*F16C 29/06* (2006.01)
(52) U.S. Cl. .................. 384/44; 384/155; 198/779; 29/898.03
(58) Field of Classification Search .................. 384/44, 384/51, 155; 198/779; 29/898.03
See application file for complete search history.

(56) References Cited

U.S. PATENT DOCUMENTS

| | | | |
|---|---|---|---|
| 534,442 A * | 2/1895 | Linn | ............ 474/154 |
| 2,644,691 A | 7/1953 | Pohle | |
| 2,723,886 A * | 11/1955 | Warshaw | ............ 384/44 |
| 3,091,189 A | 5/1963 | Becker | |
| 3,410,614 A * | 11/1968 | Shaw, Jr. | ............ 384/44 |
| 4,702,623 A | 10/1987 | Borel | |
| 4,921,361 A | 5/1990 | Steeves | |
| 5,434,938 A | 7/1995 | Tanaka | |
| 5,456,182 A | 10/1995 | Neeman | |
| 5,993,064 A * | 11/1999 | Teramachi et al. | ............ 384/51 |
| 6,070,479 A * | 6/2000 | Shirai | ............ 384/51 |
| 6,203,200 B1 | 3/2001 | Teramachi | |
| 6,709,158 B2 * | 3/2004 | Ishihara | ............ 384/44 |
| 7,628,266 B2 * | 12/2009 | Reist | ............ 198/779 |

FOREIGN PATENT DOCUMENTS

| | | |
|---|---|---|
| AT | 387156 | 12/1988 |
| DE | 19577 | 10/1882 |
| DE | 488310 | 12/1929 |
| DE | 1147896 | 4/1963 |

(Continued)

*Primary Examiner*—David B Jones
(74) *Attorney, Agent, or Firm*—Rankin, Hill & Clark LLP

(57) ABSTRACT

A roller element (10) is provided which has a central body (1) and a roller unit (2). The roller unit (2) is mounted so as to circulate on a non-circular race (21) about the central body (1) and so as to be mobile with respect to the central body (1) by the rolling movement of the rollers (3) of the roller unit (2) on the central body (1). The rollers (3) are configured as balls or substantially cylindrical elements. A peripheral surface of the rollers (3), for a substantial part, is shaped as a rolling surface that corresponds to the central body (1) and for rolling off on the central body (1). The elements of the roller unit (2) have play in relation to one another and/or the roller unit has play regarding its mobility in relation to the central body (1).

22 Claims, 13 Drawing Sheets

FOREIGN PATENT DOCUMENTS

| | | |
|---|---|---|
| DE | 1269952 | 6/1968 |
| DE | 2620864 | 11/1977 |
| DE | 8704850 | 6/1987 |
| EP | 0838602 | 4/1998 |
| EP | 0890755 | 1/1999 |
| FR | 1116656 | 5/1956 |
| FR | 2023524 | 8/1970 |
| FR | 2279969 | 2/1976 |
| GB | 387403 | 2/1933 |
| GB | 403082 | 12/1933 |

* cited by examiner

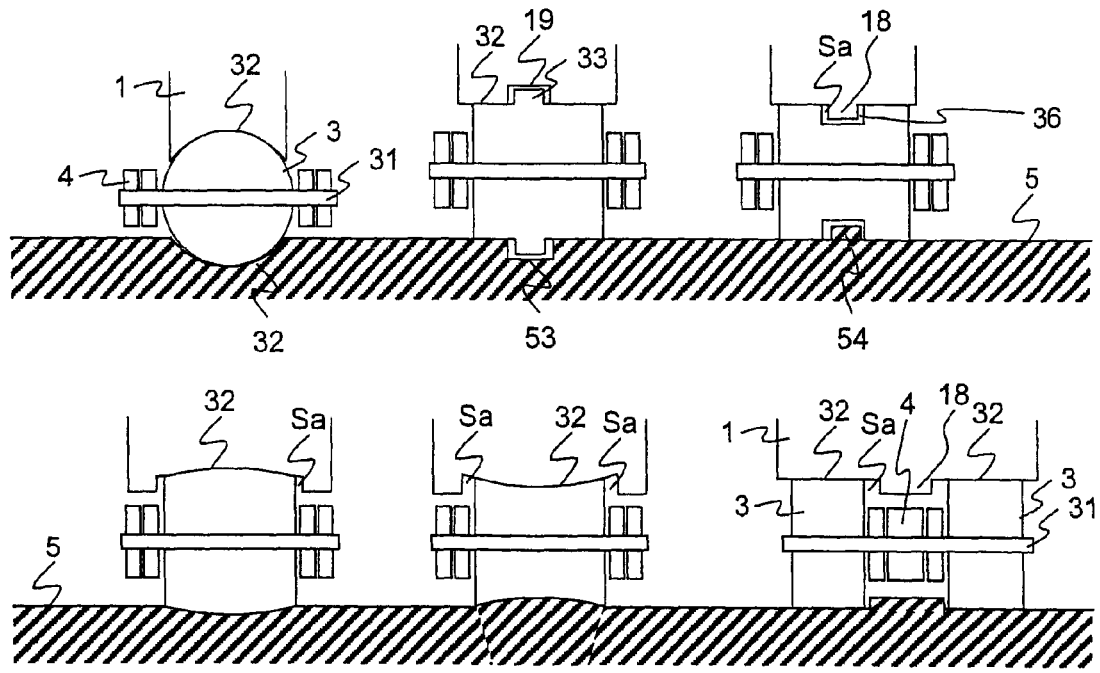
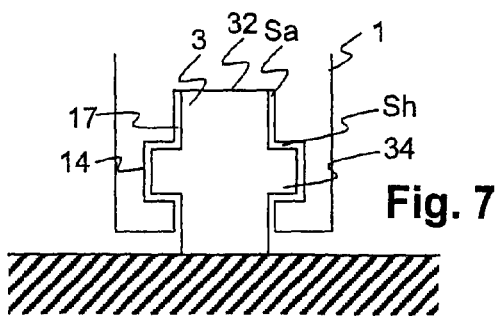
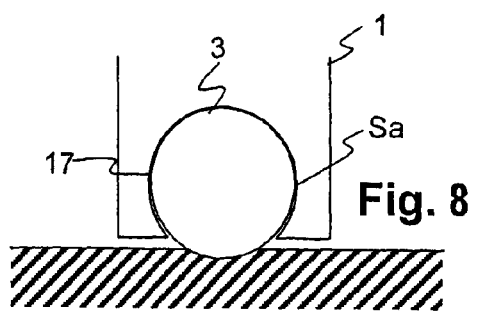
Fig. 6
Fig. 7
Fig. 8
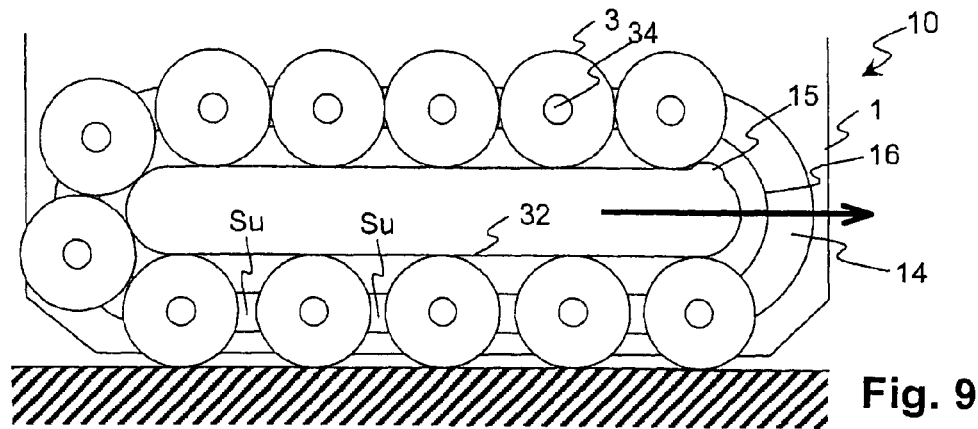
Fig. 9

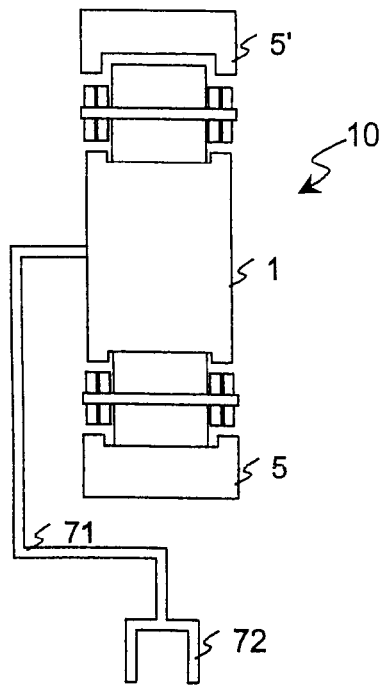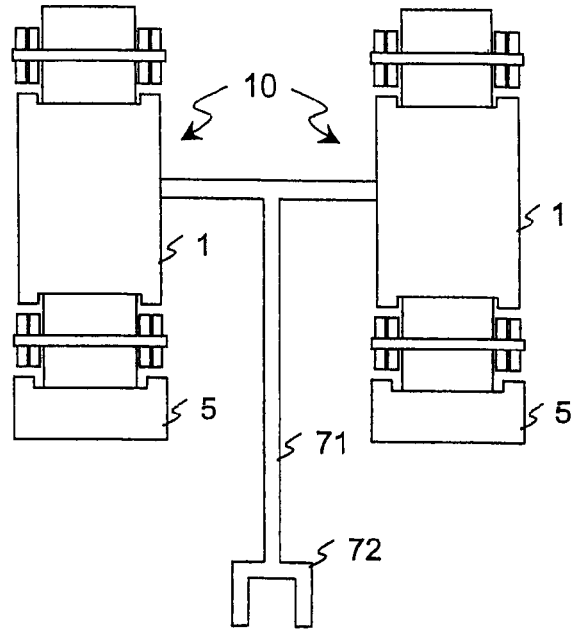
Fig. 16        Fig. 17
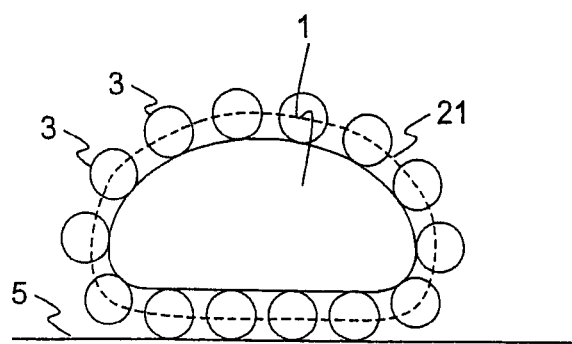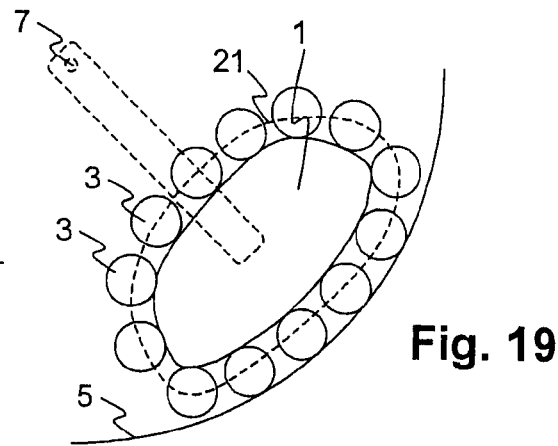
Fig. 18        Fig. 19

Detail B

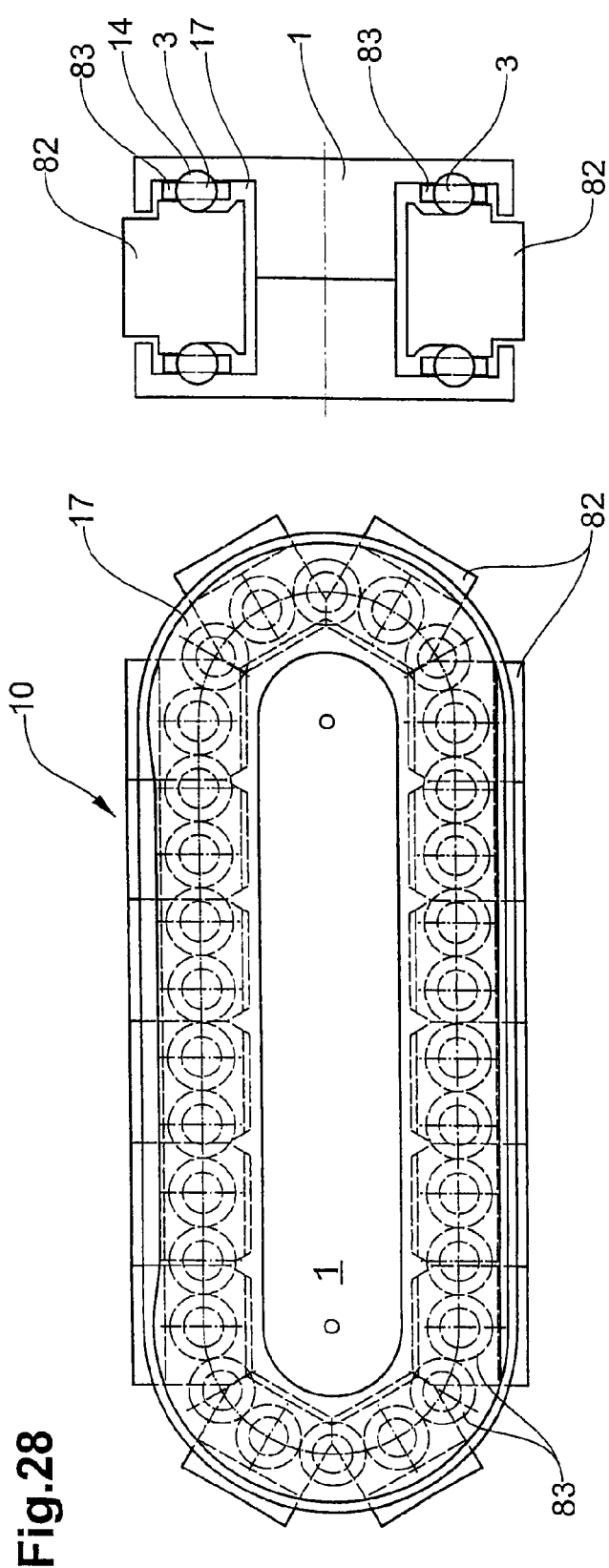
Fig.28
Fig.29
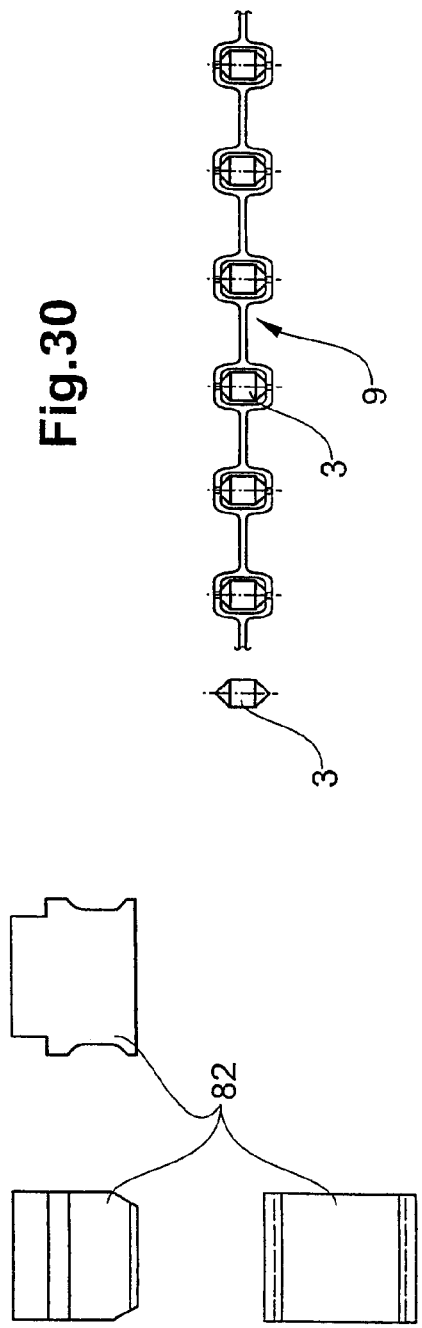
Fig.30

*Detail A*

Fig.33
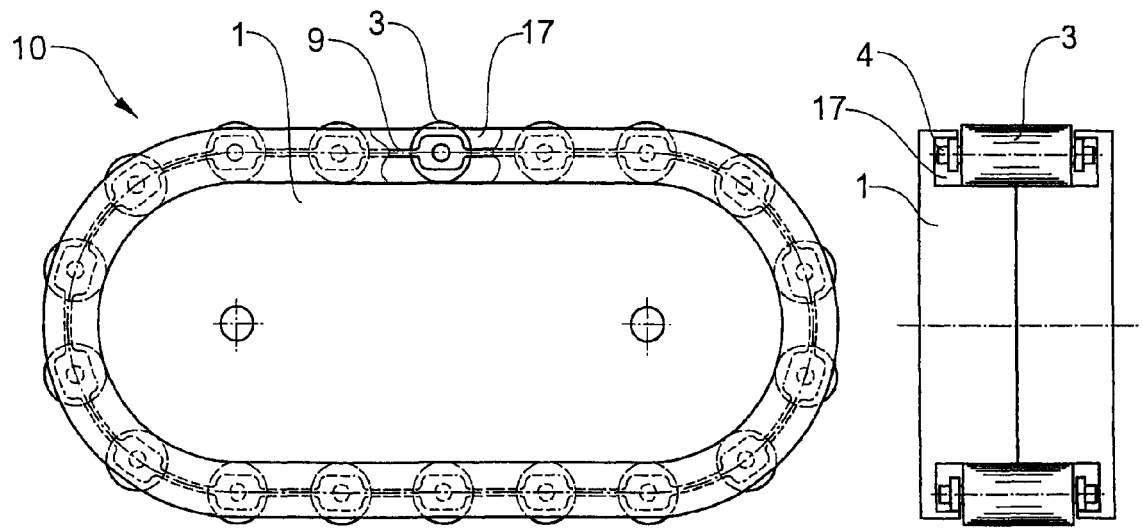
Fig. 34a
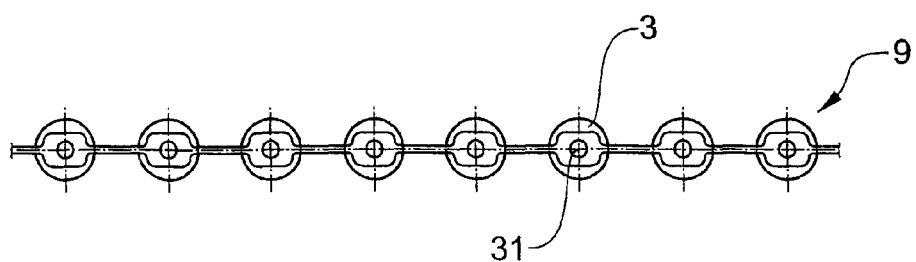
Fig. 34b
Fig. 34c
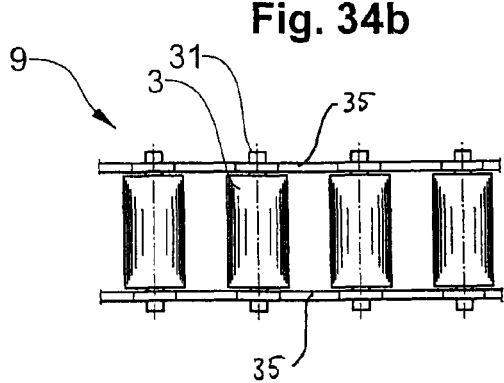
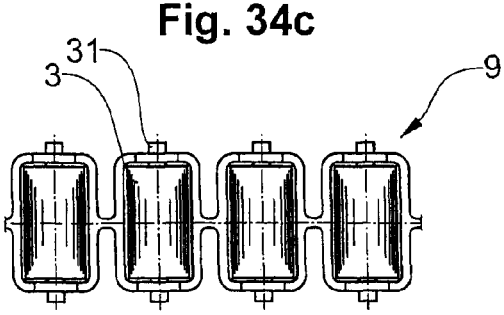

ROLLER ELEMENT

BACKGROUND OF THE INVENTION

1. Field of the Invention

The invention is related to the field of roller bearings and concerns a roller element.

2. Description of Related Art

In the case of bearings, there is among others the problem that loads are to be moved with an as low an expenditure of force and with little friction. In doing so, the construction of conveying means is to be as simple as possible. For achieving of a linear, rotary or any other guided movement between bodies, wheels are utilised, which are attached to a first body and which roll on a second body. In case of high loads the number of wheels is increased. The problem of the minimization of friction, however, remains present and is now transferred to the bearing support of the wheels.

In the patent document GB 403 082 from the year 1932, an arrangement for the utilization in travelling trolleys and undercarriages is demonstrated, in the case of which several respectively axially connected pairs of rail wheels circulate around a pair of rails running in an oval shape. In doing so, the planes of the two rail ovals are parallel to one another. The axes of successive wheel pairs are coupled with one another through connection elements or connection springs or linked together. Each pair of wheels on the one hand runs on the mentioned rails with an oval shape, and on the other hand on a stationary pair of rails or on the edges of an I-beam. When driving around the end segments of the rail ovals, the ideal chain length varies depending on the position of the wheels. This is illustrated by FIG. 36: A first position of wheels 3 and linking plates 4 is indicated with continuous lines. If the wheel on the left on top is displaced to the right by a distance D, and if all wheels remain in contact with the rail oval, then a second position results, which is indicated by broken lines. In doing so, the lowest drawn wheel is displaced by a distance, which is smaller by d than D. In the patent document GB 403 082 the springs pull the chain of wheel pairs together and so effect an equalization of the length, in order to keep the wheels on the rails with an oval shape. The construction described in accordance with the field of application (cranes, railways) is designed for very high loads, which leads to the illustrated selection of rails and rail wheels.

Furthermore the patent document GB 387 403 demonstrates creeper chains for heavy vehicles such as mobile artillery guns. The creeper chains on individual sections of their continuous track are supported on rollers moving along with them. The rollers are coupled together through their axles and run around a central body. For the movement of the vehicle, the creeper chains are driven by a drive wheel.

The mentioned devices from vehicle engineering, because they are designed for different requirements, in particular for—viewed absolutely—high loads and greater dimensions, are not capable of being utilized in materials handling technology in an efficient manner.

In AT 387 156, a ski for grass surfaces with a circulating roller running carriage is disclosed. In one embodiment, the rollers are attached to a link belt, wherein on its links extensions are developed, which grip underneath a guide rail and as a result maintain the rollers in contact with the guide rail. It is to be anticipated that this arrangement is susceptible to wear.

BRIEF SUMMARY OF THE INVENTION

It is therefore the objective of the invention to create a roller element, which is suitable for utilization in materials handling technology. In particular, it is to make possible a supported relative movement of two bodies with a low friction and with respect to its design is to be as simple as possible. In doing so, in comparison, for example, with a wheel of similar size, it is to be capable of supporting high loads, i.e., enable a high load bearing capacity with a relatively small construction size.

A roller element in accordance with the invention comprises a central body as well as a roller unit. The roller unit is arranged as movable along a non-circular continuous track extending around the central body and relative to the central body by the rolling off of rollers of the roller unit on an internal side of the roller unit. In doing so, the rollers are designed as balls or as essentially-roller shaped, one circumferential surface of the rollers to an essential part is shaped as a roller surface corresponding with the central body and for rolling-off on the central body, and the roller unit comprises play in itself and/or in its mobility relative to the central body.

Through the simple shape of the rollers in connection with the permissible play, on the one hand it is possible to implement, with respect to its design simple guiding of the roller unit around the central body, and on the other hand a cost-effective manufacturing in particular of the roller unit becomes possible. The roller unit is therefore capable of consisting of loosely connected elements and, for example, to be reliably guidable in a circumferential groove in the central body. In contrast to prior art, the play is not eliminated by springs but rather admitted or even enlarged and combined with a correspondingly robust or tolerant guidance. The roller element therefore does not comprise any further elements, which pull the roller unit to the central body or which hold it to the central body.

By means of a roller shape or barrel shape of the rollers, therefore, an essentially cylindrical or also a circular cylindrical shape, a pressure load is distributed on a contact line between the roller and the counter body. The rolling surface amounts to at least half or two-thirds of the circumferential surface.

The play in conjunction with this shape on the one hand permits a comparatively loose connection of the elements moving against one another and on the other hand nonetheless the rolling-off on the loaded sector of the roller unit, wherein the load is distributed over the surfaces rolling off against one another. Further elements, such as axes or connection pieces of the roller unit, are not significantly subject to a load or tensioned, they solely serve to pull or push the not loaded rollers of the roller unit around the central body, therefore to keep them at a distance from each other. Thanks to the play of the roller unit, in doing so it is loosely pulled and guided, so that due to the slight tolerances little friction and neither a mutual grinding off or tilting or jamming take place.

The play of the roller unit relative to the central body in preference is so large, that the roller unit at one point is capable of being lifted off from the central body by at least ⅕ or ½ of a roller diameter. Depending on the dimensions of a guide-way of the roller unit, it is also possible to tolerate a lifting off by up to a whole roller diameter, only so far, however, —taking into account the play of the roller unit as a whole in lateral, respectively, in axial direction—that the rollers are not capable of leaving the guide-way laterally.

In a different formulation, it is also possible to quantify the play in such a manner, that a length of the roller unit is at least 2% to 5% greater than the length of an adjacent roller unit without any play.

By means of the non-circular continuous track, it is possible to adapt the shape of the central body and with this the shape of the continuous track to a shape of the counter body, and with this to distribute the pressure load over several rollers. In preference, the rollers on an external side of the roller unit are provided for rolling-off on a counter body.

When the central body rolls-off on the rollers and the rollers in turn on the further body, the roller unit moves around the central body on a continuous track. In doing so, the rollers preferentially run in a guide-way of the central body, for example, in a circumferential groove. In a preferred embodiment of the invention, guide elements of the groove encircle the rollers laterally. If these guide elements are capable of being dismantled, the assembly of the roller element may be carried out in a particularly simple manner: On one side of the central body a guide element is not installed yet. It is then possible to insert the completed, closed roller unit and to assemble the guide element. Therefore, in doing so no opening and closing of the roller unit is necessary.

In preference, the roller unit comprises means for the achievement of an unchanging distance between the rollers. In this manner it is prevented, that successive rollers come into contact with one another, as a result of which it would be possible for friction losses to occur. It is possible, for example, to implement the means in that the rollers are connected together in a chain-like manner, such as in a roller chain. In contrast, however, to a roller chain, the rollers in accordance with the invention protrude beyond the connection pieces of the chain, and between the rollers there is not imperatively a larger space, such as is absolutely necessary in case of a roller chain for the engagement of the teeth of a gearwheel.

In a preferred embodiment of the invention, the means for the achieving of an unchanging distance between the rollers is at least a flexible bearing belt, which connects the bearing axles of the rollers together. As a result, the construction of the roller unit is simplified in comparison with a chain-like connecting of the rollers. In preference it is possible to utilize two bearing belts with rollers located in between, or one bearing belt between two rows of rollers. In principle, also arrangements with several rows of rollers alternating with roller strips and/or asymmetrical arrangements are possible. The connections between the individual rollers are not subjected to significant forces. In comparison with the possible loading of the roller unit these forces are small.

On principle, it is also possible to guide and to keep at a distance from each other the rollers with bearing shells located on the external side. These are formed by individual bearing shells connected together in an articulated or flexible manner and forming a movable bearing cage, in the following also referred to as cage belt. In doing so, the cage belt, in a preferred embodiment of the invention, is capable of being bent in at least two directions. Therefore, it is not only capable of moving in an even, continuous track, but also along a continuous track, which extends within a curved surface. With this, it is possible to equip roller units, which follow a curved, in particular a circular track around a center of a circle, which is at a distance from the roller element in the direction of the roller axes.

In a further preferred embodiment of the invention, the means for the keeping at a distance are loosely inserted spacers or spacer bodies, which are not chained together. The spacer bodies, in preference, are hard and rigid, essentially not flexible, and they are inserted between the rollers and contact surfaces of the spacer bodies with the rollers and designed as corresponding to, respectively, as fitting the roller shape. Therefore, for example, in case of cylindrical rollers, the spacer bodies respectively comprise two internal cylinder surfaces opposite each other. In accordance with this embodiment of the invention, therefore the roller unit consists of the totality of the rollers and spacer bodies, which are inserted together loosely and into a guide-way of the central body.

In preference, either the rollers or the spacer bodies, or both, respectively comprise holding elements. The holding elements protrude from the rollers, respectively, the spacer bodies in axial direction and run in one or two continuous grooves of the central body corresponding to the continuous track. By means of this, the movement direction of the rollers, respectively, spacer bodies equipped with holding elements is limited in radial direction.

Seen in an axial direction, in preference, the spacer bodies on the basis of the shapes corresponding to one another, respectively of the positive form fit, in part encircle the adjacent rollers. By means of this, depending on the manner of looking at it, either the rollers hold the spacer bodies and/or the spacer bodies hold the rollers in a radial direction. For this reason, it is also sufficient, if either solely the rollers or also only the spacer bodies comprise holding elements. In a first preferred variant of this embodiment, therefore, only the spacer elements comprise holding elements. The rollers without holding elements essentially are solely rotation cylinders and therefore are particularly easy to manufacture. Vice versa, in a second preferred variant of this embodiment only the rollers are equipped with holding elements. In doing so, the holding elements respectively are short pieces of axle pins or bearing pins protruding from the center of the cylinder.

The assembly of a roller element in accordance with this embodiment is particularly simple, because for it the rollers and spacer bodies have to be inserted only into a first part of the central body and with the holding elements respectively of one side into the continuous groove. After putting on a second part of the central body, the holding elements are also caught on the second side. It is not necessary to preassemble any chains and to place these around the central body and to close them, and significantly fewer individual components are required. The parts are very simply shaped and may be manufactured cheaply as mass products. For example, the spacer bodies are injection-molded parts made of nylon or of comparable plastic materials, and the rollers are made out of metal bars, for example, of aluminium, by sawing off and finish machining. It is possible to manufacture the central body out of two identically shaped halves, which following the insertion of the other parts are joined together by screwing, gluing, an interference fit or in a similar manner.

Between the not-flexible rollers and the also not-flexible spacer bodies, play is present. This on the one hand is as great as possible, in order to make a loose and friction-free pushing on of the unloaded elements around the central body possible. If not both rollers and spacer bodies comprise holding elements, on the other hand, the play must not be big enough for individual elements to be able to fall out.

In a further preferred embodiment of the invention, a sequence of rigid supporting bodies lies on the counter body and rolls-off on the central body over rollers. Thus, it is possible to view as a replacement by the rigid supporting bodies of a flexible runner belt. For this purpose, guide means are necessary, which guide the supporting bodies around the central body, for example, a conveying track and/or guideways for the rollers, wherein it is also possible, that the rollers run next to the supporting bodies. The rollers therefore, for example, run in the conveying track on two tracks laterally along the supporting bodies and support these on both sides towards the central body, In another preferred embodiment of the invention, rotation axles of the rollers lead through spacer bodies arranged laterally to the rollers. In the track direction, the spacer bodies are expanded further than the rollers. Therefore, allocated to every roller is a pair of spacer bodies, which bodies are connected, capable of rotation, with the roller through the roller axle, move along together with the rollers, and which keep the rollers at a distance from one another. Therefore only a pushing, not, however, a pulling of a sequence of rollers is possible.

With this, therefore a minimum spacing between the rollers is assured, so that the rollers do not come into contact with one another. A maximum spacing is not assured by the lateral spacer bodies themselves. Only in combination with all other rollers of the roller unit and through the limitation by means of a conveying track, in which the rollers run, is a maximum spacing also assured.

The lateral spacer bodies together with the rollers run around the central body in a conveying track. The conveying track partially encircles the lateral spacer bodies, so that they are not able to fall out in a radial direction. It is possible that the lateral spacer bodies on both sides capable of rotating on a roller are placed on short axle pins attached to the roller, or else that the lateral spacer bodies are immovably connected with an axle of the roller, around which axle the roller is arranged capable of rotating.

Between the lateral spacer bodies and the rollers, as well as between the lateral spacer bodies and the conveying track, in preference significant play is present. The parts in consequence are easily movable against one another, and they can be manufactured cost-effectively and installed in a simple manner.

In a further embodiment of the invention, one makes do completely without physical spacer means, and the spacing of the rollers is effected through a magnet contained in the rollers. The magnets are arranged in the rollers in such a manner, that in axial direction at one end a north pole and at the other end a south pole is present. The rollers are equipped with protruding axle parts as holding elements and are inserted into the central body in the same direction, so that they repel one another in circumferential direction. The magnetic forces in operation solely have to exert the force for moving the unloaded rollers around the central body.

In a preferred embodiment of the invention, between the central body and the counter body a runner belt or a creeper chain belt made of rigid elements is arranged, which encircles the roller unit along its complete circumference, so that the roller element rolls-off on a counter body over the runner belt. As a result of this, any unevenness in the counter body is compensated, and through the utilization of suitable materials for the belt it is possible that an adhesion between the roller unit and the counter body is increased.

In a further preferred embodiment of the invention, the rigid counter body does not move along with the roller element. It is possible that it is, for example, a guide rail or a body with a guide groove, or else simply a flat surface. A loading of the central body in the direction of this surface is transmitted directly through the rollers. A possible bearing support of the rollers in doing so it not significantly loaded. These roller bearings therefore may be implemented in the most simple manner as friction bearings or plain bearings. As a result of this, the construction becomes very simple overall.

Typically the counter body is a stationary support or a guide rail. In another way it is, however, also possible, that the roller element is stationarily fixed relative to the surroundings and that the counter body moves.

If one makes do without the mentioned means for spacing, this invention can be implemented in a particularly simple manner. In doing so, the rollers run in a guide-way of the central body, for example, in a continuous groove. This guide-way defines a position of the rollers in their axial direction. In doing so, in general it is accepted, that the rollers come into contact and rub against each other. In a preferred embodiment of the invention, this rubbing together is prevented in a zone of the continuous track, in which the rollers are loaded. This takes place, by taking care with the design of the continuous track and/or of the guide-way on the central body, that the rollers respectively than have a spacing between each other, when they enter into this zone. As soon as the rollers are in the loaded zone, their spacing is defined by the rolling-off movement on both sides and remains constant. If the rollers are barrel-shaped or implemented as balls, then the contact, respectively the friction, surface between the rollers is reduced.

The shape of the continuous track, preferably, is an oval with semi-circular end sections, which are connected by an upper and a lower straight section. The lower straight section faces the further body. The other sections do not imperatively have to be formed by the described semi-circles and the straight, it is sufficient, that they permit a low in loss returning of the roller unit onto itself.

In a further preferred embodiment of the invention, instead of the straight sections circular sections with a common center point are present. With this, it is possible to arrange the roller element as a bearing element between two circular bearing parts.

In a further preferred embodiment of the invention, the central body comprises a continuous track curved two-fold. The continuous track, apart from first curves, which are required for the circulation of the rollers around the central body, and which extend essentially parallel to the bearing axles of the rollers, comprises in particular a second curve, the axis of which is essentially vertical to the curve axes of the first curves.

In a still further embodiment of the invention, the central body itself is not rigid, but comprises at least two parts, which are flexibly movable relative to one another within limits. For this purpose, the parts, for example, are connected together with a spring element made of plastic, rubber or metal. The, therefore to a certain extent flexible, central body is capable of adapting itself to a curved counter body. In doing so, on the one hand it is possible that the continuous track of the rollers lies in a plane, wherein also the movement of the central body relative to the counter body remains within this plane. On the other hand, however, it is also possible, that the continuous track and the mentioned movement are external to a side of a plane, therefore within a curved surface. In an embodiment of the invention of this kind, the above mentioned cage belt that is bendable in two directions is appropriately utilizable.

In a preferred embodiment of the invention, a roller respectively comprises a guide element. This is formed by an incision or a protruding part of the roller, for example, by a notch, such as a groove, which runs in the direction of rotation of the roller, or else by a bulge, such as rib on the roller. In preference, corresponding to a notch or a groove, a bulge or a fin is formed in the central body, or vice versa corresponding to a rib of a roller, a groove on the central body. Depending on how the roller element is utilized, it is also possible that in the further body a corresponding guide is formed.

The rollers comprise an essentially rotation cylindrical shape. In preference they are essentially cylindrical with a constant diameter, or else bomb shaped, such as bulged out cylindrical, or, however, also spherically shaped. Also in the case of these shapes it is possible, that the shape of the continuous track on the central body and/or the shape of the further body are correspondingly formed.

The individual components of the roller elements can be manufactured with relatively large tolerances and therefore cost-effectively, without the operability being reduced by this. The rollers, preferably, are in a single part and made out of a hard plastic material.

The roller element may be considered as an oval roller bearing or ball bearing, with the advantage, that a load may be spread over several rollers and that it is possible for the arrangement to be manufactured as overall more load bearing than conventional bearings with similar dimensions.

The roller element, in accordance with the invention, furthermore may be utilized wherever rollers or wheels in bearings roll-off on flat or uniformly curved surfaces. Thus it is possible, that an individual roller element runs guided in a rail and is equipped with a holding device for an article to be conveyed, for example, with a clamp or clasp. In this, it is also possible that several roller elements run one behind the other and that they are chained together. Or else several roller units may be arranged on a vehicle in place of conventional wheels. In a preferred embodiment of the invention, several roller elements are arranged distributed along a bearing track between two bodies and at a distance from one another. With this, with a limited requirement of materials high bearing forces can be absorbed.

On the basis of the simple design, it is also possible the make the roller element small, if required. In an exemplary embodiment of the invention, the central body is 2 cm up to 5 cm or 10 cm long and 1 cm up to 3 cm high, and rollers have a diameter and/or a length of around 7 mm up to one or two or three centimeters.

In the following, the object of the invention is explained in more detail on the basis of preferred examples of embodiments, which are illustrated in the attached drawings. These respectively schematically illustrate:

BRIEF DESCRIPTION OF THE DRAWINGS

FIG. 6 various forms of rollers;
FIGS. 7 and 8 cross sections through a part of a roller element in further preferred embodiments of the invention;
FIG. 9 schematically the mode of operation of a further embodiment of the invention;
FIGS. 16 and 17 embodiments of the invention in association with a gripper;
FIGS. 18 and 19 further embodiments of the invention;
FIG. 28 a roller element with rigid supporting bodies;
FIG. 29 different views of a supporting body;
FIG. 30 an embodiment of a cage belt;
FIG. 33 a further roller element with a cage belt;
FIG. 34 the cage belt utilized in FIG. 33.

DETAILED DESCRIPTION OF THE INVENTION

Figure 1:
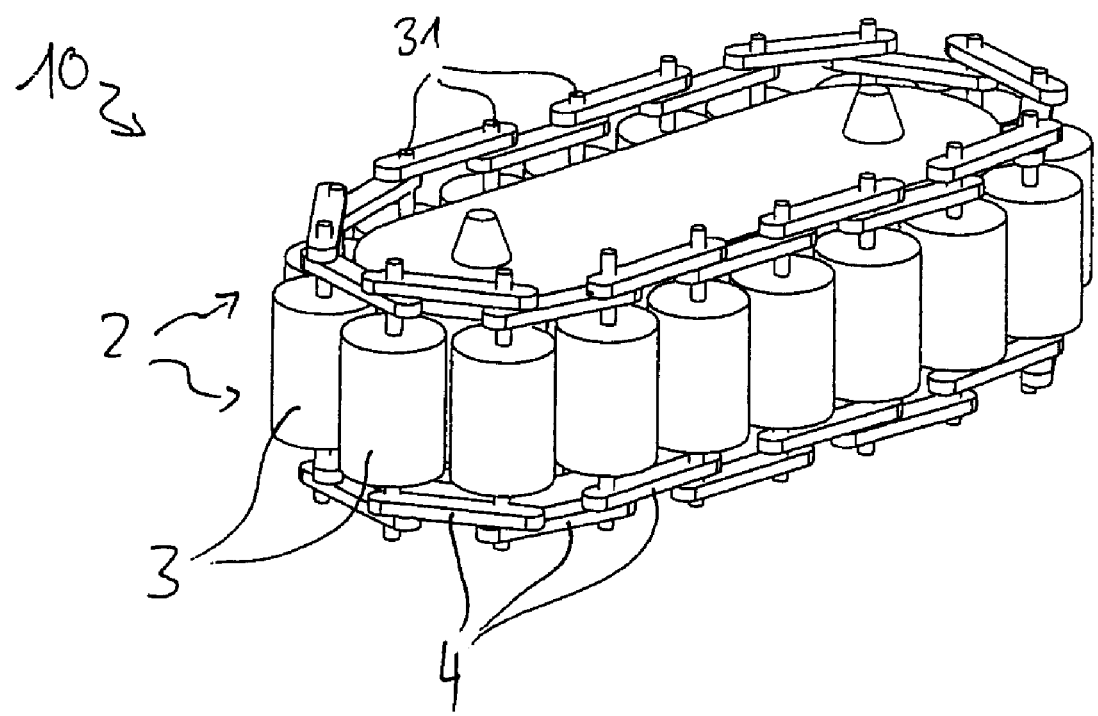
FIG. 1 a perspective view of a roller element in accordance with a preferred embodiment of the invention.

The reference marks used in the drawings and their significance are listed in summary in the list of reference marks. In principle, in the Figures the same parts are marked with the same reference marks.

Figure 2:
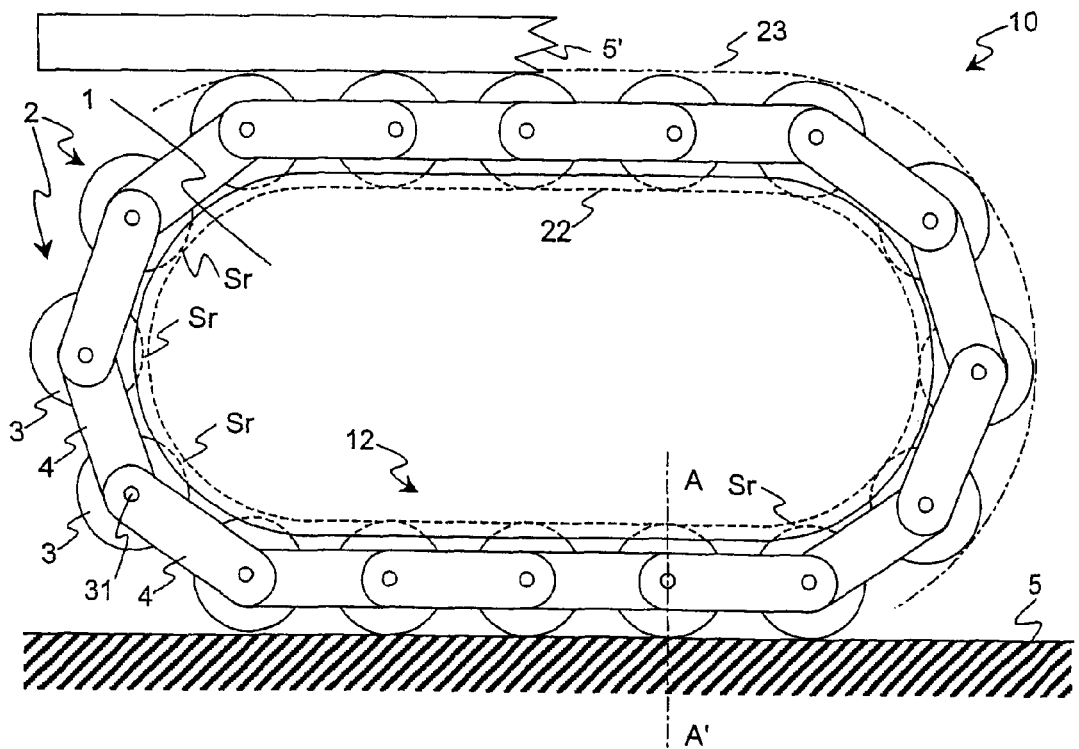
FIG. 2 a side view of a roller element according to FIG. 1.

FIG. 1 depicts a perspective view and FIG. 2 schematically a side view of a roller element 10 in accordance with a preferred embodiment of the invention. The roller element 10 comprises a central body and a roller unit 2 circulating around it. The roller unit 2 consists of a plurality of rollers 3, the bearing axles 31 of which are connected together through chain link plates 4.

The chain link plates 4, together with the rollers 3, form a roller chain. The diameters of the rollers 3 in doing so are so large relative to the chain link plates 4, that the rollers 3 protrude beyond the chain link plates 4 inwards as well as outwards in radial direction. With this, a side of the totality of the rollers 3 forms an internal side 22 of the roller unit 2. Correspondingly, a side on the external side of the totality of the rollers 3 forms an external side 23 of the roller unit 2. This internal side 22 and external side 23 are imagined units and are indicated in the FIG. 2 with dashed lines. On the internal side 22 the rollers 3 are able to roll-off on the central body 1, on the external side 23 on a further body, in the following referred to as counter body 5. If the side of the central body 1, which is facing the counter body 5, has a shape corresponding to the shape of the counter body 5, then a load on the central body 1 in the direction of the counter body 5 is distributed over several rollers 3. Illustrated here is a flat counter body 5 and correspondingly a straight section 12 of the central body 1. In case of a displacement of the central body 1 in the plane of the drawing parallel to the counter body 5, the central body 1 rolls-off on the counter body 5 over the rollers 3. In doing so, the roller unit 2 moves around the central body 1 in a continuous track 21. At some points of the roller unit 2 the rollers 3 are not in contact with the central body 1, but are at a distance from it of a radial play Sr. Where and when the radial play occurs depends on the direction of the movement and speed of the movement as well as on coincidental movements, which are caused by irregularities. A force relative to the counter body 5 is capable of acting on the central body 1, so that the central body 1 may be considered as supported by the roller unit 2. Or else a force may act on a second counter body 5', which relative to the roller element 10 is opposite the counter body 5 and which rolls-off on the roller element 10, and therefore is supported by the roller element 10 relative to a first counter body 5. A part of a second counter body 5' is schematically depicted in FIG. 2 on the left-hand top.

Figure 3:
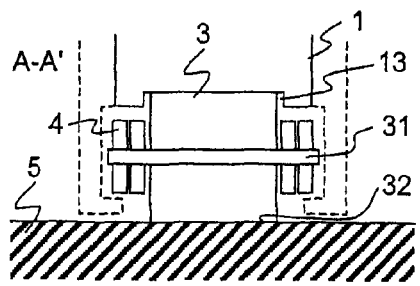
FIG. 3 a cross section through a part of a roller element from the view according to FIG. 2.

FIG. 3 illustrates a cross section A-A' through a part of a roller element 10 according to FIG. 1. It becomes visible, how the rollers 3 run in a guide groove 13 of the central body 1 and are held by these in axial direction. The guide groove 13, in sections or completely, extends along the continuous track 21 of the roller unit 2. As indicated with dashed lines, it is also possible that the central body jointly encircles the chain links or a roller belt according to FIG. 4.

Figure 4:
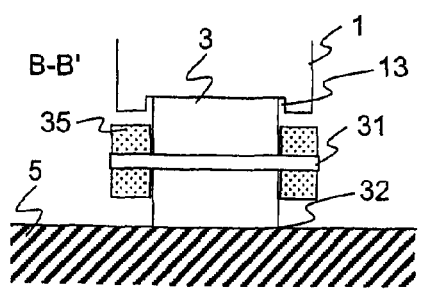
FIG. 4 a cross section through a part of a roller element with a belt for distancing the rollers.
Figure 5:
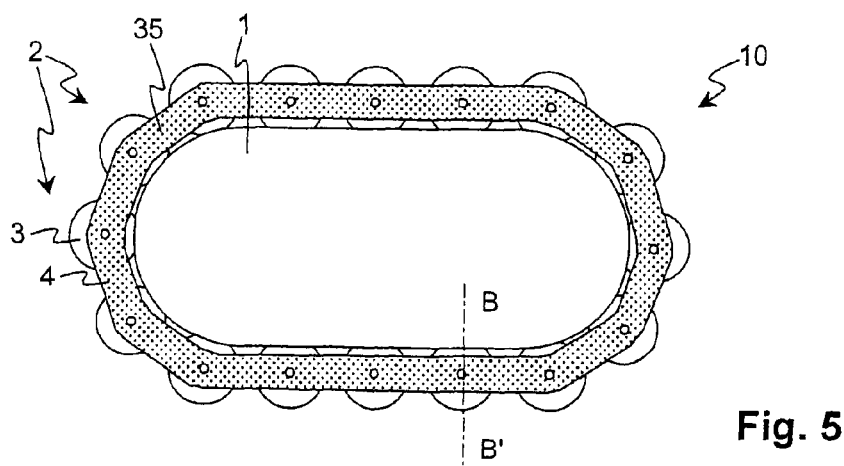
FIG. 5 a side view of a roller element according to FIG. 4.

FIG. 4 illustrates a cross section B-B' through a part of a roller element 10 with a flexible belt or a bearing belt 35 instead of chain link plates 4 for spacing the rollers according to FIG. 5. The bearing belt 35 is equipped with holes with a uniform spacing for receiving the bearing pins 31. FIG. 5 depicts a corresponding side view.

Figure 31:
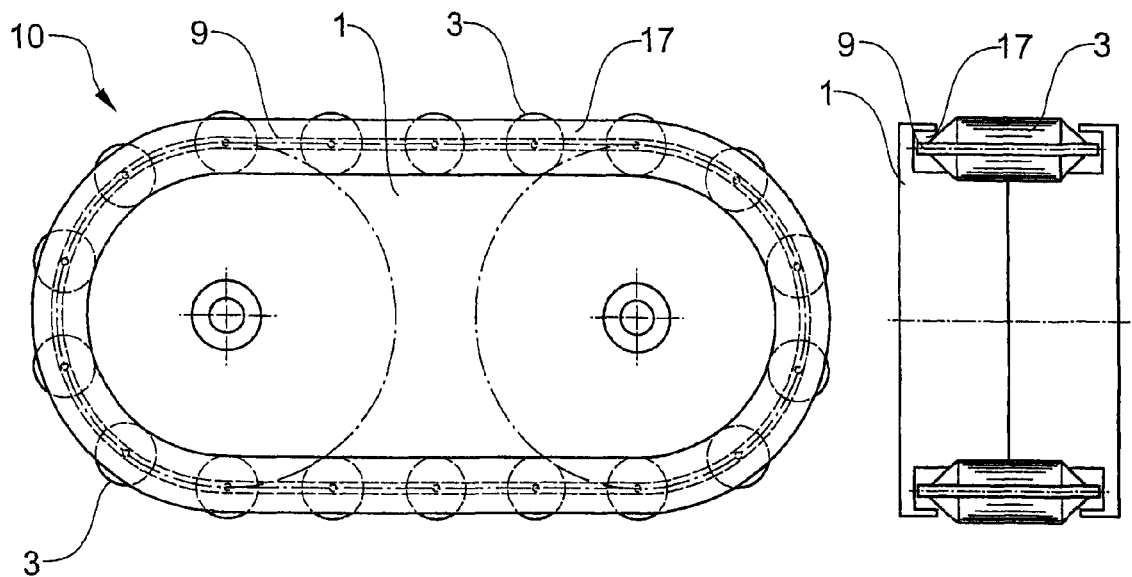
FIG. 31 a roller element with a cage belt.
Figure 32:
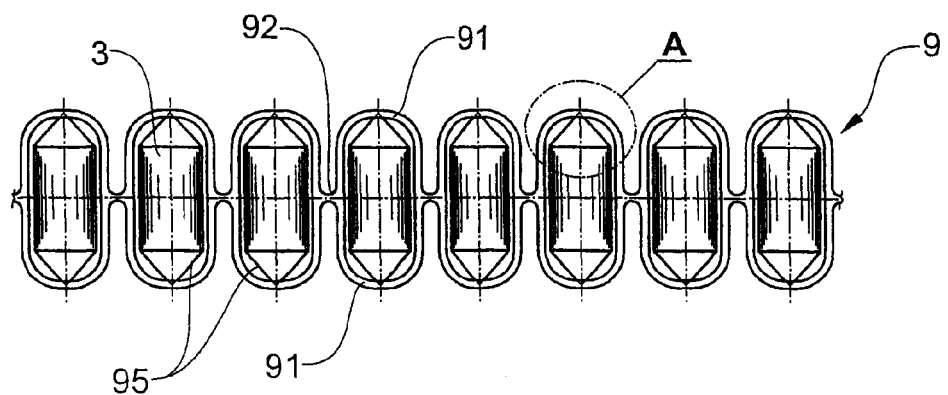
FIG. 32 a further embodiment of a cage belt.
Figure 32:
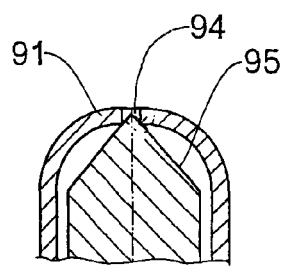
Figure 36:
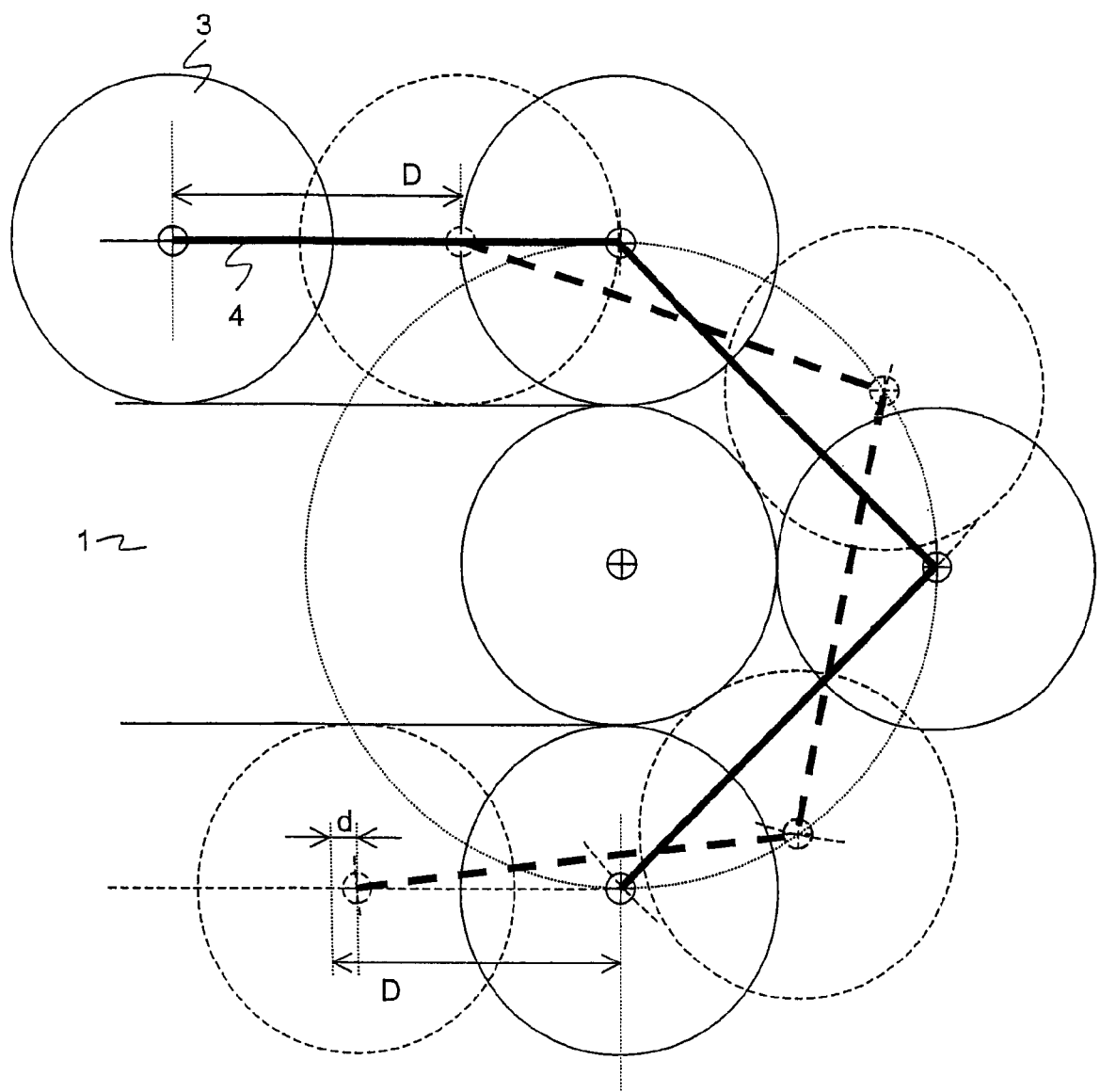
FIG. 36 a movement of a chain of rollers around one end of a central body.

FIG. 31 illustrates a roller element 10 with a cage belt 9. FIG. 32 depicts the cage belt 9 utilized in FIG. 31. The cage belt 9 consists of a flexible material, preferably a plastic material, such as nylon. On the one hand it comprises ring-like holding zones 91, into which the rollers 3 are inserted, and on the other hand link zones 92, which flexibly join together the holding zones 91. The cage belt 9 in preference is made out of one part. The rollers 3 are also manufactured out of plastic material or else out of metal, in particular steel. In this embodiment of the invention, the rollers 3 are conical and running together to a point, as a result of which conical axle elements 95 are formed. On the internal sides of the holding zones 91 internal cones respectively located opposite one another are formed as bearing points 94. These internal cones effect a bearing support for the rollers 3. Instead of conical elements, it is of course also possible to utilize another shape for the bearing support, for example, a cylindrical one. The connection by the link zones 92, viewed in the running direction of the rollers, is arranged at least practically at the center of the rollers 3. A cage belt 9 is capable of being bent within a plane vertical to the roller axes, and in this manner may be utilized with a central body 1 according to, for example, FIG. 31.

Thanks to the central connection by the link zones 92, however, the cage belt 9 is also capable of being bent outside this plane, so that the central body 1 does not have to have a flat continuous track 21. Furthermore, the cage belt 9, by virtue of the link zones 92, is capable of being twisted, and as a result it is also possible that the roller unit 2 follows a track, which calls for a torsion of the roller unit. A cage belt 9 of this kind therefore can be utilized in a versatile manner and in addition it is possible to manufacture it in a simple manner in large numbers.

Figure 25:
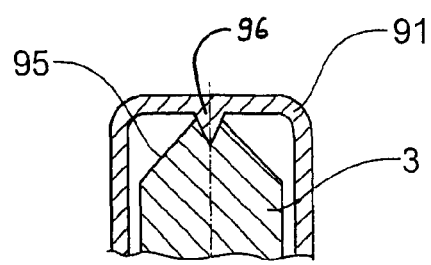
FIG. 25 a detail of the bearing support of a roller.

FIG. 25 illustrates an alternative embodiment of the bearing support of a roller 3 in the holding zone 91. The rollers 3 in this embodiment therefore comprise two indentations for the bearing support, wherein these indentations may also be formed by a continuous hole along the roller axis. The holding zone 91 of the connecting body 9 comprises bearing projections 96 opposite one another, which upon insertion of the rollers 3 snap into the indentations. In order to simplify this, the bearing projections 96, as well as the axle elements 95 of the previous embodiment are in preference designed as tapering and in particular as running together to a point.

FIG. 33 illustrates a further roller element 10 with a further cage belt 9, and FIG. 34a depicts this cage belt 9 in a separate view. The cage belt 9 in the zone of the bearing pins 31 on both sides of the rollers 3 comprises bearing openings or indentations for receiving the protruding bearing axles 31. In a variant with a view from above according to the FIG. 34b, the cage belt 9 comprises two separate halves or bearing belts 35, which respectively connect the bearing axles 31 on both sides of the roller unit 2. As a result, the roller unit 2 as a whole is only bendable in one direction. In order that the roller unit 2 does not fall apart and nonetheless is capable of being assembled, the bearing axles 31 are installed in the bearing belts with an interference fit and the rollers 3 are loosely rotatable around the bearing axle 31. In the variant according to the FIG. 34c, like in case of the embodiments up to now, a bending in two directions is possible. Here too, it is possible that the bearing axles 31 are fixed in the connecting body 9 by means of an interference fit. It is also possible, however, that the bearing axles 31 are molded fixed to the rollers 3 and loosely lie in the holding zones 91 of the joining body 9.

Figure 35:
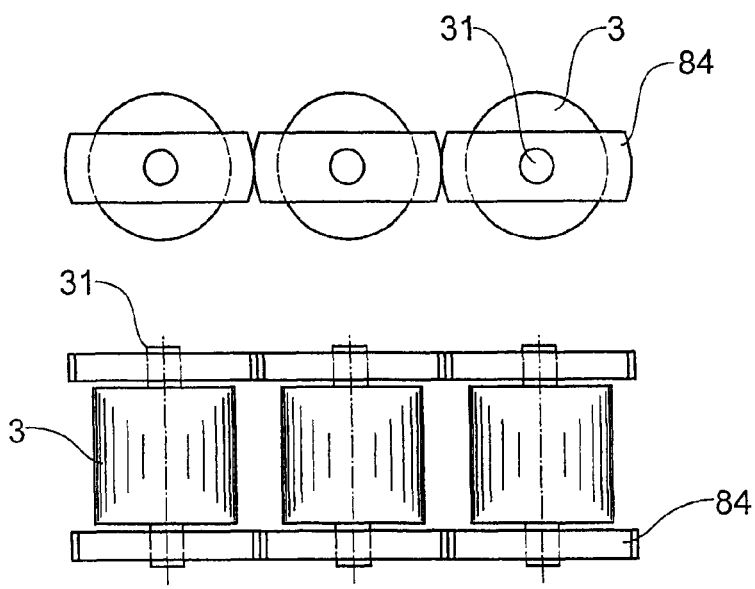
FIG. 35 spacer bodies arranged laterally to the rollers.

FIG. 35 illustrates separate lateral spacer bodies 84 arranged on both sides of the rollers 3. With them, only pressure forces, not, however, tractive forces can be transmitted between the spacer bodies 84. The lateral spacer bodies 84 run around the central body 1 in a bearing groove 14 for the radial movement limiting and serve both for the bearing support as well as for spacing the rollers. The ends of the spacer bodies 84 pushing against one another in preference are cylinder segment surfaces, wherein their cylinder axle coincides with the bearing axle 31. As a result, the ends of successive spacer bodies 84 are able of rolling-off against one another. This in particular in the case of changes of direction enables an easy moving of the roller unit 2.

FIG. 6 illustrates different shapes of rollers 3. It is thus possible, that the rollers 3 are designed as spheres or as cylinders with a constant diameter, the cylinders, however, can also be bomb-shaped, respectively, bulged out towards the inside or outside. Depending on the application in question, this is an advantage. The bomb-shaped forms, for example, make a tilting movement of the central body 1 relative to the counter body 5 possible.

The rollers 3 may also comprise comb-like guide elements 33, which correspond to appropriate groove-like guide elements 13, 53 of the central body 1 and of the counter body 5. Vice versa it is also possible that the rollers 3 comprise groove-like guide elements 36 and correspondingly the central body 1 and/or the counter bodies 5 bridge or comb-like guide elements 18, 54. By the corresponding guide elements 13, 33, 53, 18, 36, 54, respectively, by the utilization of bomb-shaped or spherical rollers 3, lateral forces may be absorbed and a deviation of the movement of the roller unit 2 from the corresponding guiding direction of the guide elements is prevented.

The dimensions of the corresponding guide elements are selected in such a manner, that a lateral or axial play Sa between the rollers 3 and the central body 1, respectively, its guide elements results.

In a further preferred embodiment of the invention, a roller 3 comprises two coaxial roller halves, which are connected through an axle. The chain links 4 for connecting the axles of adjacent rollers 3 are fixed to the bearing axle 31 between the roller halves.

In individual examples of the shapes depicted, the proportion of the respective rolling surface 32 of the circumferential surface is visible. In the cross section through a roller 3 the circumferential surface is essentially proportional to the length of the roller 3, and the rolling surface 32 is proportional to the contact line, on which the roller 3 rolls off on the central body 1. In case of a roller or cylinder without formed-in guide elements, the rolling surface 32 is equal to the circumferential surface. If guide elements are present on the roller 3 and/or on the central body 1, the rolling surface 32 is correspondingly smaller, in preference, however, always larger than half or ⅔ or ¾ of the circumferential surface.

In case of the embodiment depicted in FIG. 6 and in further embodiments, a circulating chain made of chain link plates 4 may be replaced by a bearing belt 35.

FIG. 7 illustrates a cross section through a roller element 10 of a further embodiment of the invention. In this embodiment, the roller unit 2 solely consists of the rollers 3, without any connection elements being present between the rollers 3. In this, the rollers 3 on both sides respectively comprise bearing pins 34, which protrude axially in the middle. Correspondingly the guide groove 13 of the central body 1 also comprises bearing grooves 14 recessed in axial direction and extending along the continuous track 21 and with this forms a conveying track 17 for the rollers 3. The bearing grooves 14 are designed for receiving and holding the rollers 3 by means of the bearing pins 34. The rollers 3 are therefore displaceable or rollable along the continuous track 21 around the central body 1. The bearing pins 34 comprise an axial play Sa and in radial direction a play Sh relative to the bearing grooves 14, so that the rollers 3 roll-off on the central body 1 over a rolling surface 32, therefore the circumference of the cylinder.

FIG. 8 illustrates a variant of this embodiment, wherein the rollers 3 are balls, which are movably arranged in a circulating conveying track 17. In this, the conveying track has the shape of a circulating recess in the central body 1, which encircles the balls in the cross section.

FIG. 9 schematically illustrates the mode of operation of the further embodiment of the invention according to FIG. 7. This may be transferred accordingly to the variant according to FIG. 8. Depicted are the central body 1 with rollers in cross section, wherein the inner edge 16 of the bearing groove 14 and the course of the rolling surface 32 become visible. In order to assure that the rollers 3 in the loaded zone have a certain spacing, respectively, play in circumferential direction Su between one another, on the one hand the roller element 10 does not comprise as many rollers 3 as there would be space for along the continuous track 21, and on the other hand means for delaying the entrance of a roller 3 into the loaded zone are present. In the embodiment of the invention presented here it is assumed, that the central body 1 is moved with an unchanging orientation relative to the force of gravity. Then a delaying means is formed by an obstacle in the continuous track 21, which protrudes upwards and which hereinafter is referred to as braking nose 15. During the rolling-off of the roller element 10, in the Fig., for example, in the direction of the arrow to the right, on the left side the rollers relieved of the load are pushed upwards and over the central body 1 to the right by the last roller, which is still under load. The braking nose 15 prevents that a roller 3 located on top right on the right slides downwards and enters into the loaded zone. Only when the following rollers 3 push this roller over the braking nose 15, does it fall downwards, guided on both sides by the bearing groove 14, and is then rolled-over by the central body 1. In FIG. 9 the braking nose 15 is developed in the rolling surface 32, it is also possible, however, that it instead is a bulge in the bearing groove 14. The number of rollers 3 and the geometry of the continuous track 21 are designed in such a manner, that this only takes place in a position, when the preceding roller 3 is already part of the way in the loaded zone.

For a movement in the opposite direction, at the other end of the central body 1 there is also a braking nose 15 formed on the rolling surface 32, respectively, on the inner edge of the bearing grove 16.

Figure 10:
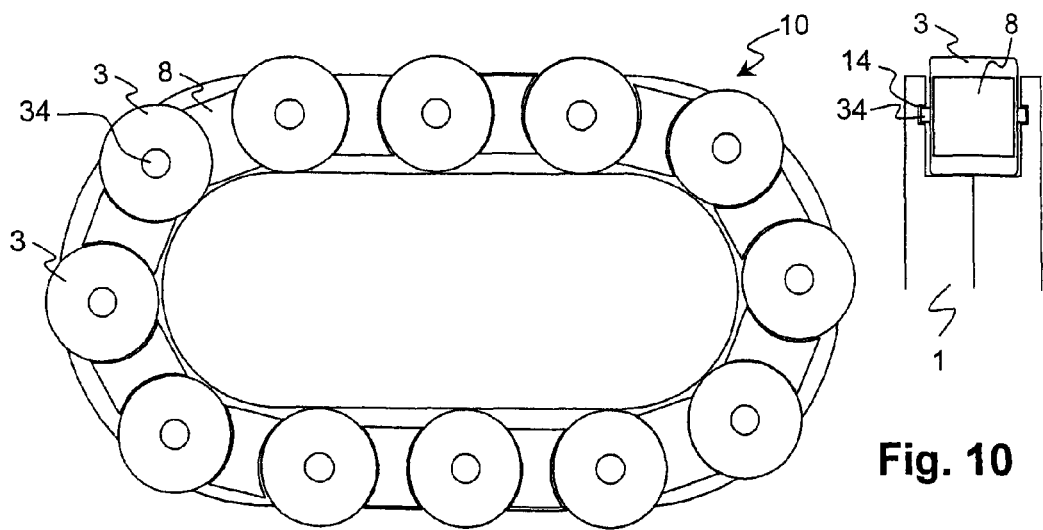
FIGS. 10 to 12 further embodiments of the invention with loosely placed together rollers and spacer elements.
Figure 11:
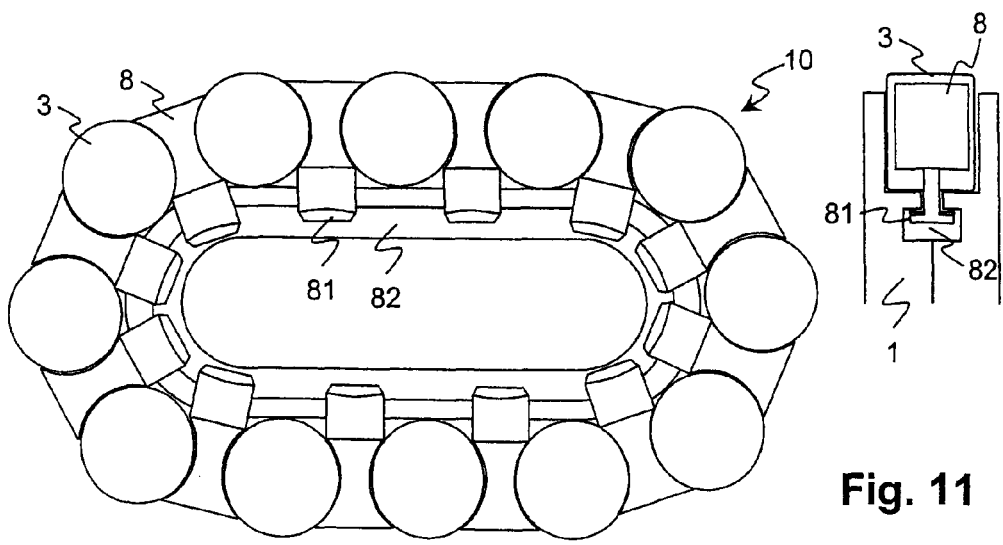
Figure 12:
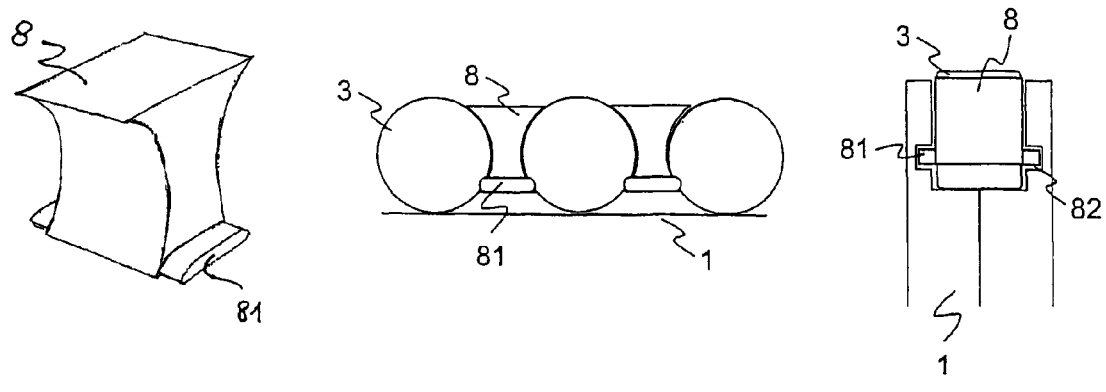

FIGS. 10, 11 and 12 illustrate further preferred embodiments of the invention, in the case of which loosely inserted spacers or spacer bodies 8 serve for spacing the rollers 3. The Figures respectively schematically depict a view of rollers 3 and spacer bodies 8 in axial direction, wherein one half of the central body 1 has been removed, as well as a cross section of them in a cut-out of the central body 1. The rollers 3 depicted in these Figures are cylindrical, and correspondingly the spacer bodies 8 inserted between the rollers 3 comprise concave cylindrical surfaces, the radius of which is essentially the same as the radius of the rollers. In case of barrel-shaped or spherical rollers, or in case of rollers with a groove or with a comb, the corresponding surfaces of the spacer bodies 8 are also shaped correspondingly.

In the embodiment of the invention according to FIG. 10, the rollers 3 comprise bearing pins 34, which extend in a continuous bearing groove 14 or the central body 1 and which prevent the rollers 3 from falling out in a radial direction. The spacer bodies 8 are held solely on the basis of the positive locking with the rollers 3 and comprise no holding elements in connection with the central body 1.

In the embodiments according to the FIGS. 11 and 12, vice versa the spacer bodies 8 comprise holding noses or holding cams 81, which protrude in axial direction and which are guided in corresponding continuous guide elements or grooves 82 of the central body 1. As a result of this, the spacer bodies 8 are capable of being displaced around the central body 1 and their movement is limited in a radial direction. The rollers 3 comprise no holding elements of their own and they are held in a radial direction by the spacer bodies 8, which partially encircle them.

In the embodiment according to FIG. 11 holding noses 81 are formed on the spacer body 8 by a bridge, with which they form the shape of an inverted "T" and they are respectively guided in a continuous groove 82, which in the central body 1 and viewed in radial direction extends below the rollers 3. This embodiment of the invention enables a narrow construction of the roller element 10.

In FIG. 12, apart from a cross section only a part of a roller element 10 is depicted, and instead a perspective view of a corresponding spacer body 8 is shown. In this embodiment holding noses 81 of a spacer body 8 protrude on both sides (viewed in the direction of movement) and they respectively are guided in a continuous groove 82, which extends in the central body 1 and viewed in a radial direction at the height of the rollers 3. This embodiment makes a simple and robust construction of the spacer bodies 8 possible.

Figure 13:
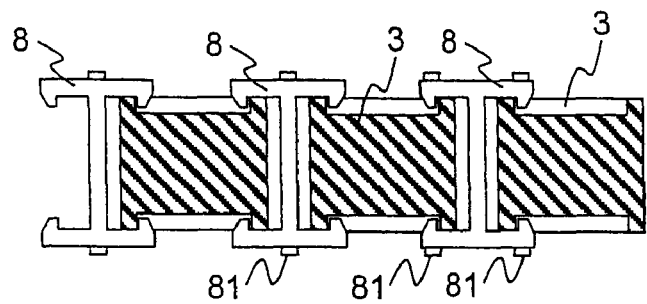
FIG. 13 a further embodiment of the invention.

FIG. 13 illustrates a further embodiment of the invention, in which the spacer bodies 8 on two sides are designed as clamps, which engage in internal cylindrical recesses of the rollers 3. The rollers 3 are depicted in cross section along their axes, so that this engaging becomes visible. The spacer bodies 8, in preference in the middle, as depicted in the left-hand spacer body 8, or at the external ends, as depicted in the right-hand spacer body 8, comprise holding noses 81.

Figure 14:
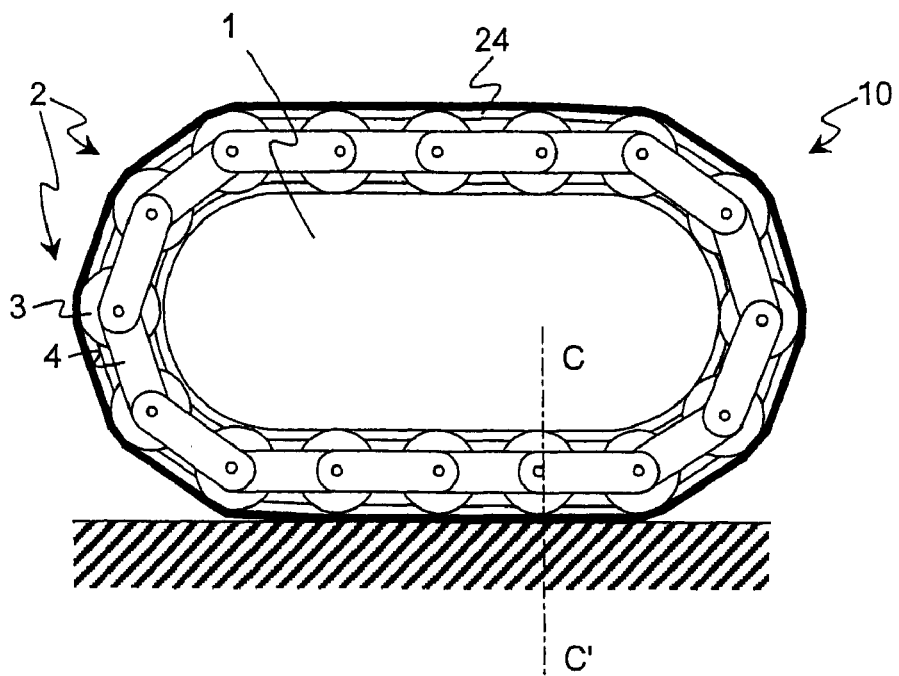
FIG. 14 a side view of a roller element with a runner belt.

FIG. 14 illustrates a side view of a roller element 10 with a runner belt 24. The runner belt 24 extends along the whole external side 23 of the roller unit 2 and encircles it. The runner belt may be made out of a flexible material, such as plastic or rubber, as a strap or as a toothed belt, or else corresponding to a creeper chain out of a rigid material.

Figure 15:
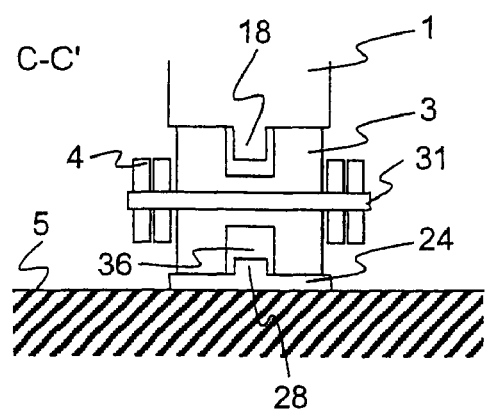
FIG. 15 a cross section through a part of a roller element according to FIG. 14.

FIG. 15 illustrates a cross section C-C' through a part of a roller element 10 from the view according to FIG. 10. In it the roller 3 comprises a groove extending in the direction of rotation as guide element 36. Into the groove 36 on the one hand a guide bridge 18 of the central body 1 protrudes and on the other hand a guide bridge 28, which is formed on the runner belt 24.

FIGS. 16 and 17 schematically and in cross section illustrate embodiments of the invention in association with a gripper 72. In FIG. 16 a roller element 10 is supported on one side in a counter body 5 designed as a rail and is stabilized on the opposite side by a further counter body 5'. The further counter body 5' here is fixed to the counter body 5 and does not roll-off on the roller unit 2 as depicted in FIG. 2. Attached to the roller element 10 is an arm or carrying bracket 71, which carries a gripper 72. According to FIG. 17, two roller elements 10 arranged laterally staggered and guided in allocated rails 5 are connected by a carrying bracket 71.

FIGS. 18 and 19 schematically illustrate further embodiments of the invention: It is not imperatively necessary, that the rollers 3 run on an oval continuous track 21. FIG. 18 depicts an in sections straight and otherwise curved course of the continuous track 21. FIG. 19 depicts a course without any straight sections, in the case of which one part of the continuous track 21 comprises a curve, which corresponds with a curve of the counter body 5, which in turn forms a circular contact surface to the roller element 10. In doing so, it is possible, that the roller element 10 is arranged as being rotatable by a lever around a rotation axis 7. Vice versa, in another embodiment of the invention it is also possible, that also the continuous track 21 in parts is formed as curved inwards, so that the roller element 10 is capable of rolling-off outside on a regular cylindrical surface.

Figure 20:
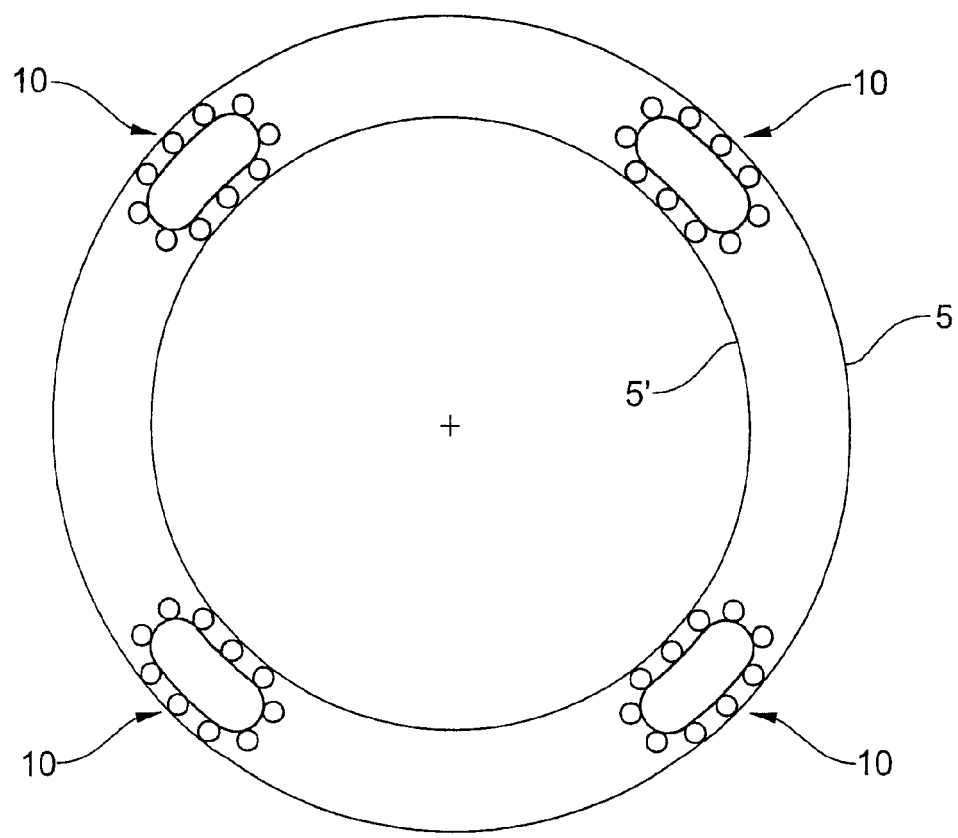
FIG. 20 a roller element as bearing element.

FIG. 20 schematically illustrates roller elements 10, which are utilized as bearing elements. In this, several roller elements 10 are arranged between two bodies 5, 5' to be supported opposite each other, which therefore are able to roll-off against each other over the roller elements 10. In the case of ring-shaped bearings, in this manner comparatively great forces may be absorbed with little effort. In doing so, at least three roller elements 10 are uniformly distributed around the circumference of the bearing between regular cylindrical, concentric surfaces of the bodies 5, 5'.

Figure 21:
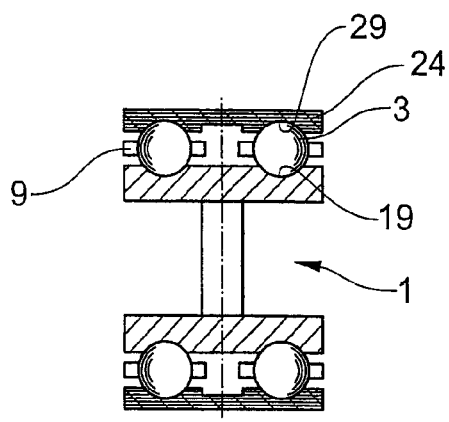
FIGS. 21 and 22 further embodiments of the invention with a runner belt.
Figure 22:
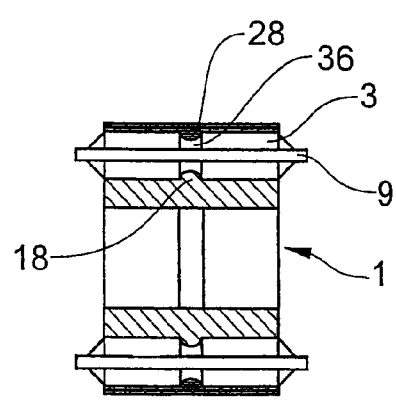

FIGS. 21 and 22 illustrate further embodiments of the invention with a runner belt 24. According to FIG. 21, the runner belt 24 rolls off on two parallel rows of rollers 3, which are held and guided by individual cage belts 9 or by a common cage belt 9. In this it is possible that the rollers 3, as explained in conjunction with FIG. 32, are shaped and supported, or as in FIG. 21 caught in a cage belt 9 as balls. The central body 1 and the runner belt 24 comprise guide grooves 19, 29 corresponding with the shape of the roller 3. According to FIG. 22, the roller unit 2 is implemented with a cage belt 9 similar to that of the FIG. 32. The rollers 3 comprise a guide groove 36, and in correspondence the central body 1 comprises a guide bridge 18 and the runner belt 24 comprises a guide bridge 28.

Figure 23:
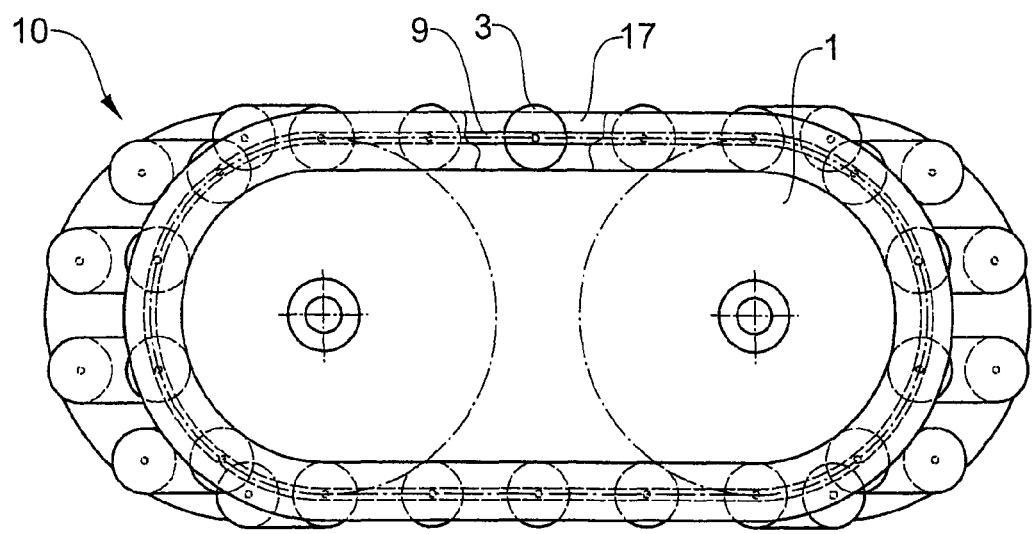
FIGS. 23 and 24 a roller element with a curved central body.
Figure 24:
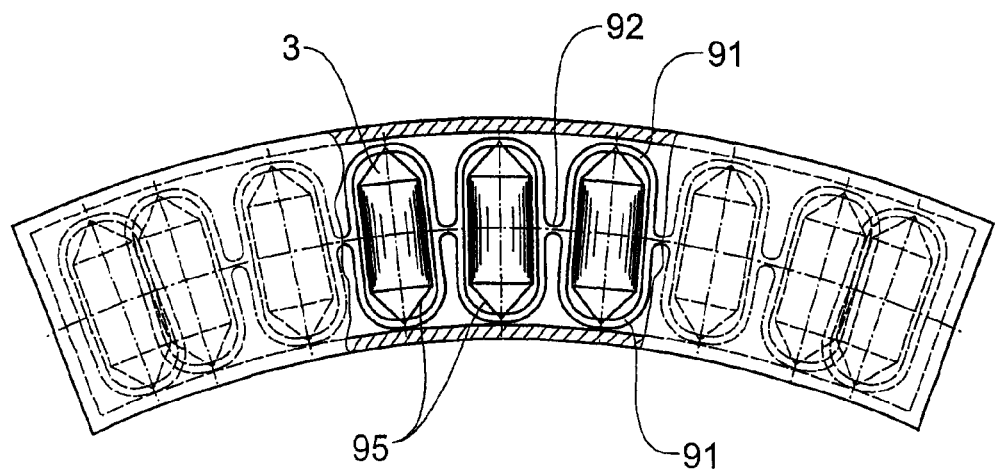

FIGS. 23 and 24 illustrate a roller element 10 with a curved or bent central body 1. The continuous track 21 and with this also the roller unit 2 here are curved two-fold. For the lateral guiding of the rollers 3 it is possible to utilize one of the arrangements according to FIG. 6, or else, as in the cross section D-D' according to FIG. 25, a chain running in the middle or a belt for connecting the bearing axles 31 is able to be guided in a guide groove 19 of the central body 1. Thus there is no circulation plane anymore, but rather a movement of the roller centers in a curved surface. In this, the axes of the rollers 3 are vertical to this surface and therefore depending on their position on the continuous track 21 not parallel to each other. The movement in this track is made easier by the circumstance, that the roller unit 2 and the central body 1 in radial direction and in axial direction have play between each another. Several roller elements 10 of this type are capable of being arranged in a ring-shaped bearing similar as in FIG. 20. In doing so, the roller elements 10 lie between bearing rings with the same diameter arranged one above the other and serve for absorbing forces above all vertical to the place of the ring.

Figure 26:
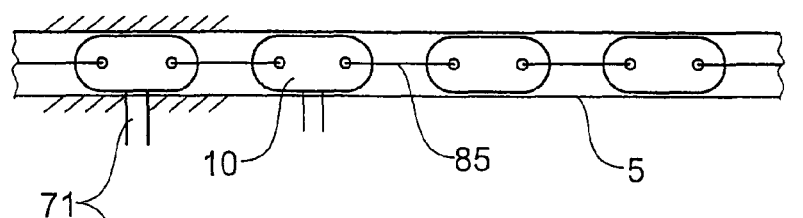
FIGS. 26 and 27 interlinked roller elements.
Figure 27:
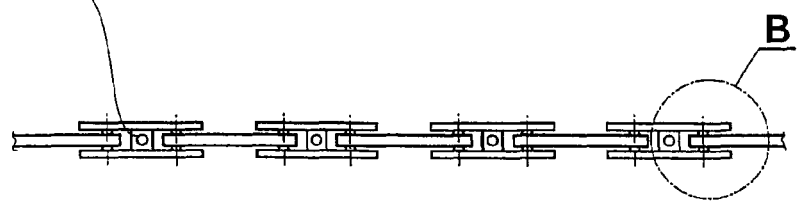
Figure 27:
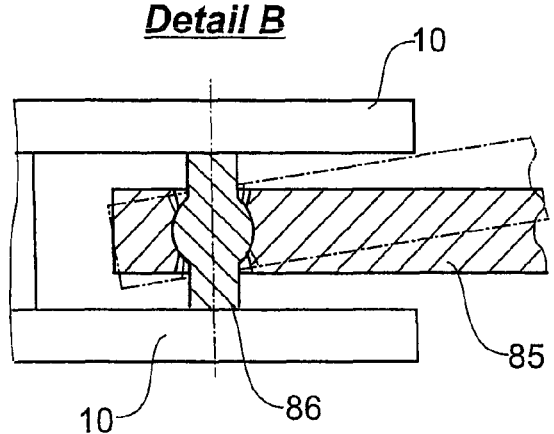

FIGS. 26 and 27 illustrate linked roller elements 10. Two roller elements 10 respectively are flexibly linked together through a connecting element 85. A roller element 10 in preference comprises respectively two roller units 2 arranged in parallel with one central body 1, respectively. The two central bodies 1 are connected together in the middle and, for example also connected with a carrying bracket 71. At both ends between the central bodies 1, respectively, an articulated fixing device to a connecting element 85 is arranged. The fixing device is also depicted in a detailed view of the FIG. 27. It consists of a connecting bridge 86 between the central bodies 1, to which a connecting element 85 is attached by means of a ball joint.

FIG. 28 illustrates a roller element 10 with rigid supporting bodies 82. The supporting bodies 82 run in the conveying track 17 and laterally are bearing supported by a sequence of sphere-shaped rollers 3 in bearing grooves 14 of the conveying tracks. The rollers 3 respectively carry a roller ring 83 for the spacing. The roller rings 83, for example, are manufactured as a single piece out of plastic material, and comprise an internal surface corresponding to a spherical surface, so that the spheres are capable of being snapped into rings 83*e*, and that the balls are able to be snapped into the roller rings 83. FIG. 29 depicts different views of supporting body 82.

FIG. 30 illustrates an adapted embodiment of a cage belt 9, and a single roller 3 capable of being inserted into the case belt 9 as an alternative to the roller rings of FIG. 28. Inserted into the holding zones 91 of the cage belt 9 as rollers 3 are rollers with conically pointed ends. In contrast to the cage belt 9 of the FIG. 31, here two lateral caged belts 9 are utilized, and these belts bend in such a manner, that the axes of the rollers 3 remain in the same plane—and also remain parallel to the plane of the continuous track 21.

On principle it is possible to combine the various illustrated variants of cage belts 9, roller shapes, roller bearing supports, roller elements, spacer elements together in many different ways.

| LIST OF REFERENCE MARKS | |
|---|---|
| 1 | Central body |
| 10 | Roller element |
| 12 | Straight section |
| 13 | Guide groove |
| 14 | Bearing groove |
| 15 | Braking nose |
| 16 | Inner edge of the bearing groove |
| 17 | Conveying track |
| 18 | Guide bridge of the central body |
| 19 | Guide groove of the central body |
| 2 | Roller unit |
| 21 | Continuous track |
| 22 | Internal side |
| 23 | External side |
| 24 | Runner belt/creeper chain |
| 28 | Guide bridge of the runner belt |
| 29 | Guide groove of the runner belt |
| 3 | Roller |
| 31 | Bearing axle |
| 32 | Rolling surface |
| 33 | Guide element |
| 34 | Bearing pin |
| 35 | Bearing belt |
| 36 | Guide groove on roller |
| 4 | Chain link plate |
| 5, 5' | Counter body, further counter body |
| 53 | Guide element |
| 54 | Guide bridge on the counter body |
| 7 | Rotation axis |
| 71 | Carrying bracket/arm |
| 72 | Gripper |
| 8 | Spacer body |
| 81 | Holding nose, holding cam |
| 82 | Supporting body |
| 83 | Roller ring |
| 84 | Lateral spacer body |
| 85 | Connecting element |
| 86 | Connecting bridge |
| 9 | Cage belt |
| 91 | Holding zone |
| 92 | Link zone |

-continued

LIST OF REFERENCE MARKS

| 94 | Bearing point |
| 95 | Axle element |
| 96 | Bearing projection |

The invention claimed is:

1. A roller element (10), comprising:
a central body (1), as well as
a roller unit,
wherein said roller unit (2) is arranged to run around the central body (1) on a non-circular continuous track,
wherein the roller unit (2) includes rollers (3) which, on an internal side of the roller unit (2), are movable, by rolling, around the central body (1),
wherein the rollers (3) are rotatably supported on both sides, in an axial direction, in a lateral spacer body (84) that moves along with the rollers,
wherein the lateral spacer bodies (84), in a running direction, are larger than the diameter of the rollers, so that the rollers (3) are spaced apart from one another, and
wherein the at least one central body (1) comprises means for temporarily holding articles to be conveyed.

2. The roller element (10) in accordance with claim 1, wherein the rollers (3), on an external side of the roller unit (2) and on one side of the central body (1), roll on a counter body (5), and wherein between the roller unit (2) and the counter body (5) a belt or a creeper chain (24) is arranged, which extends around the outside of the roller unit (2), and which, over the whole circumference of the roller unit (2), lies against the roller unit (2).

3. The roller element (10) in accordance with claim 2, wherein the rollers (3) comprise guide elements (33, 36).

4. The roller element (10) in accordance with claim 3, wherein the guide elements of the rollers (3) are grooves (36) extending in a circumferential direction of the rollers (3).

5. The roller element (10) in accordance with claim 4, wherein the belt or a creeper chain (24) comprises a guide ridge (28), which engages in the grooves (36) extending in circumferential direction of the rollers (3).

6. The roller element (10) in accordance with claim 1, wherein the rollers (3) are cylindrical and comprise the shape of a bulging out cylinder or a bulging in cylinder.

7. The roller element (10) in accordance with claim 1, wherein the rollers (3) are each made in one piece and molded out of plastic material.

8. The roller element (10) in accordance with claim 1, wherein the central body (1) on a first side comprises a first circular arc track section, and on a second side, located opposite the first side, comprises a second circular arc track section, wherein the two circular arc track sections are concentric.

9. A bearing utilizing a roller element (10) in accordance with claim 8, wherein at least three roller elements (10) are arranged around the circumference of a ring-shaped bearing between two counter bodies (5, 5') supported against one another.

10. A conveying device utilizing a roller element (10) in accordance with claim 1, wherein several roller elements (10) are arranged in a sequence and two roller elements (10) respectively are movably connected together through a connecting element (85).

11. The roller element in accordance with claim 1, wherein the rollers and the lateral spacer bodies run around the central body in a conveying track, and a play is present between the lateral spacer bodies and the conveying track.

12. A roller element (10), comprising:
a central body (1), as well as
a roller unit, wherein said roller unit (2) is arranged to run around the central body (1) on a non-circular continuous track,
wherein the roller unit (2) includes rollers (3) which, on an internal side of the roller unit, (2) are movable, by rolling, around the central body (1),
wherein the rollers (3) are designed as balls or as essentially roller-shaped,
a circumferential surface of the rollers (3) is shaped as a rolling surface (32) corresponding with the central body (1) and for rolling on the central body (1),
the roller unit (2) comprises a flexible means for achieving an unchanging spacing between the rollers (3), wherein the flexible means connects bearing axles (31) of the rollers (3) together,
wherein the flexible means is a cage belt (9), which comprises ring-like holding zones (91), in which the rollers (3) are inserted, and link zones (92), which flexibly connect the holding zones (91) together,
wherein the roller unit (2) comprises play therein and the play of the roller unit relative to the central body is so big, that the roller unit at one point is able to be lifted off from the central body by at least ⅕ of a roller diameter.

13. The roller element (10) in accordance with claim 12, wherein the cage belt (9) is formed in one piece out of a plastic material.

14. The roller element (10) in accordance with claim 13, wherein on the internal sides of the holding zones (91), bearing locations (94) are formed opposite one another and on the rollers (3) corresponding axle elements (95) are formed, and that the rollers (3) by means of the axle elements (95) are inserted into the bearing locations (94).

15. The roller element (10) in accordance with claim 14, wherein the bearing locations (94) are formed as inner cones and the axle elements (95) are formed as outer cones.

16. The roller element (10) in accordance with claim 12, further comprising rigid supporting bodies (82), which absorb forces to a counter body (5), wherein the supporting bodies (82) are not connected together and are movable around a conveying track (17) of the central body (1) and wherein by the rollers (3) the supporting bodies are bearing supported relative to the central body (1), and wherein the rollers (3) are spaced apart from one another by individual roller rings (83) surrounding the rollers or by a cage belt (9).

17. The roller element (10) in accordance with claim 12, wherein the central body (1) comprises a continuous track curved two-fold.

18. The roller element (10) in accordance with claim 17, wherein the continuous track, apart from first curvatures which are required for circulating the rollers around the central body (1) and which essentially run parallel to bearing axles 31 of the rollers 3, comprises a further curvature, the axis of which essentially is vertical to the curvature axes of the first curvatures.

19. The roller element (10) in accordance with claim 12, wherein the rollers (3) are spherical.

20. A cage belt (9) for a roller element (10) in accordance with claim 12, wherein the cage belt (9) comprises ring-like holding zones (91), in which rollers (3) are inserted, and link zones (92), which flexibly connect the holding zones (91) together, wherein the cage belt (9) is formed as a single piece from a plastic material.

21. A roller element (10), comprising:
a central body (1), as well as
a roller unit,
wherein said roller unit (2) is arranged to run around the central body (1) on a non-circular continuous track,
wherein the roller unit (2) includes rollers (3) which, on an internal side of the roller unit (2), are movable, by rolling, around the central body (1),
wherein the rollers (3) are rotatably supported on first and second sides of the roller unit, in an axial direction, in a lateral spacer body (84) that moves along with the rollers,
wherein the lateral spacer bodies (84), in a running direction, are larger than the diameter of the rollers, so that the rollers (3) are spaced apart from one another, and
wherein the lateral spacer bodies on the first side of the roller unit are not linked to one another and play is present therebetween, and the lateral spacer bodies on the second side of the roller unit are not linked to one another and play is present therebetween, so that only a pushing but not a pulling movement of a sequence of rollers is possible.

22. A roller element (10), comprising:
a central body (1), as well as
a roller unit,
wherein said roller unit (2) is arranged to run around the central body (1) on a non-circular continuous track,
wherein the roller unit (2) includes rollers (3) which, on an internal side of the roller unit (2), are movable, by rolling, around the central body (1),
wherein the rollers (3) are rotatably supported on both sides, in an axial direction, in a lateral spacer body (84) that moves along with the rollers,
wherein the lateral spacer bodies (84), in a running direction, are larger than the diameter of the rollers, so that the rollers (3) are spaced apart from one another, and
wherein ends of the spacer bodies pushing against one another are circular cylinder segment surfaces whose cylinder axis coincides with a bearing axis of the corresponding roller.

* * * * *